Patented Aug. 3, 1954

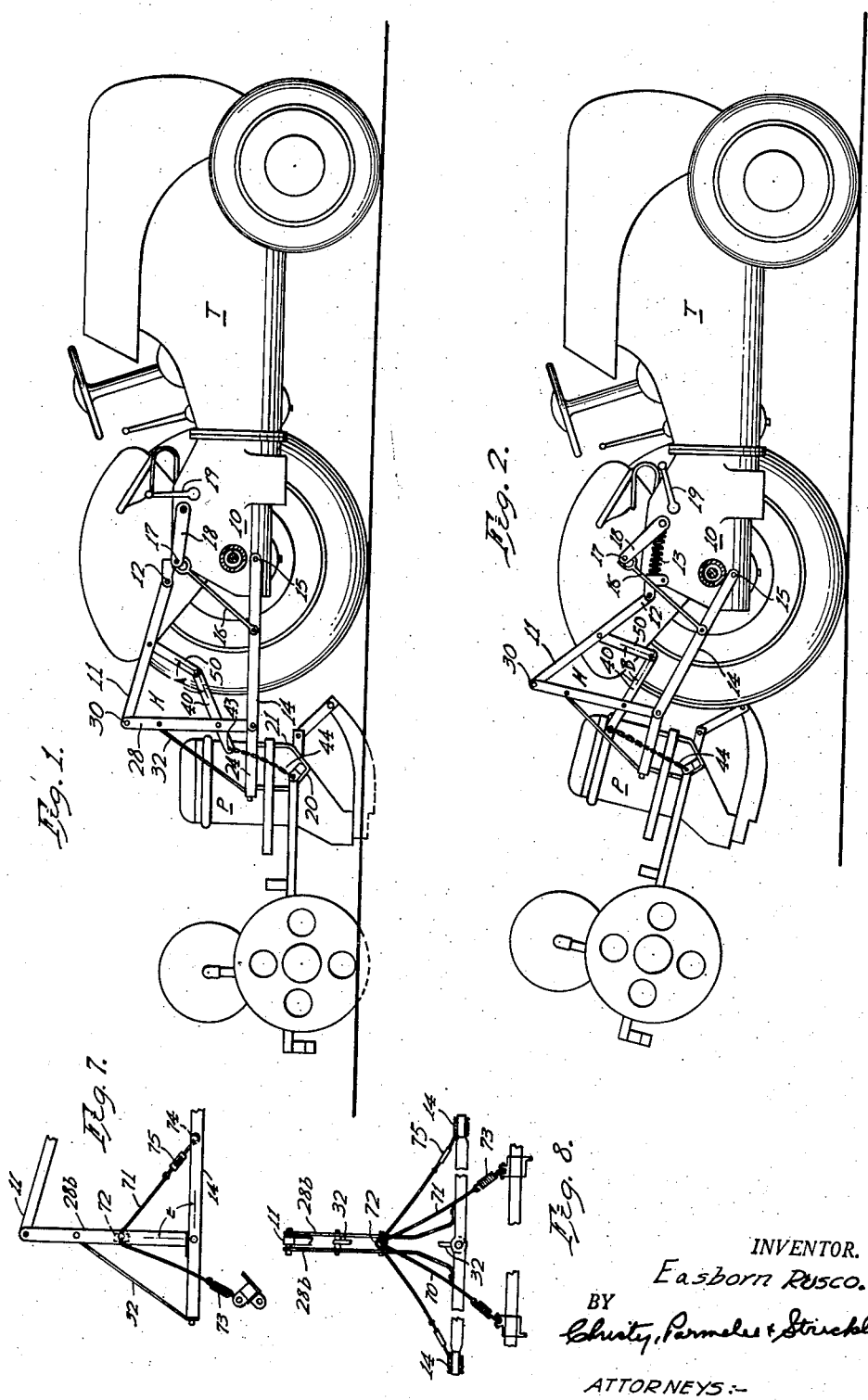

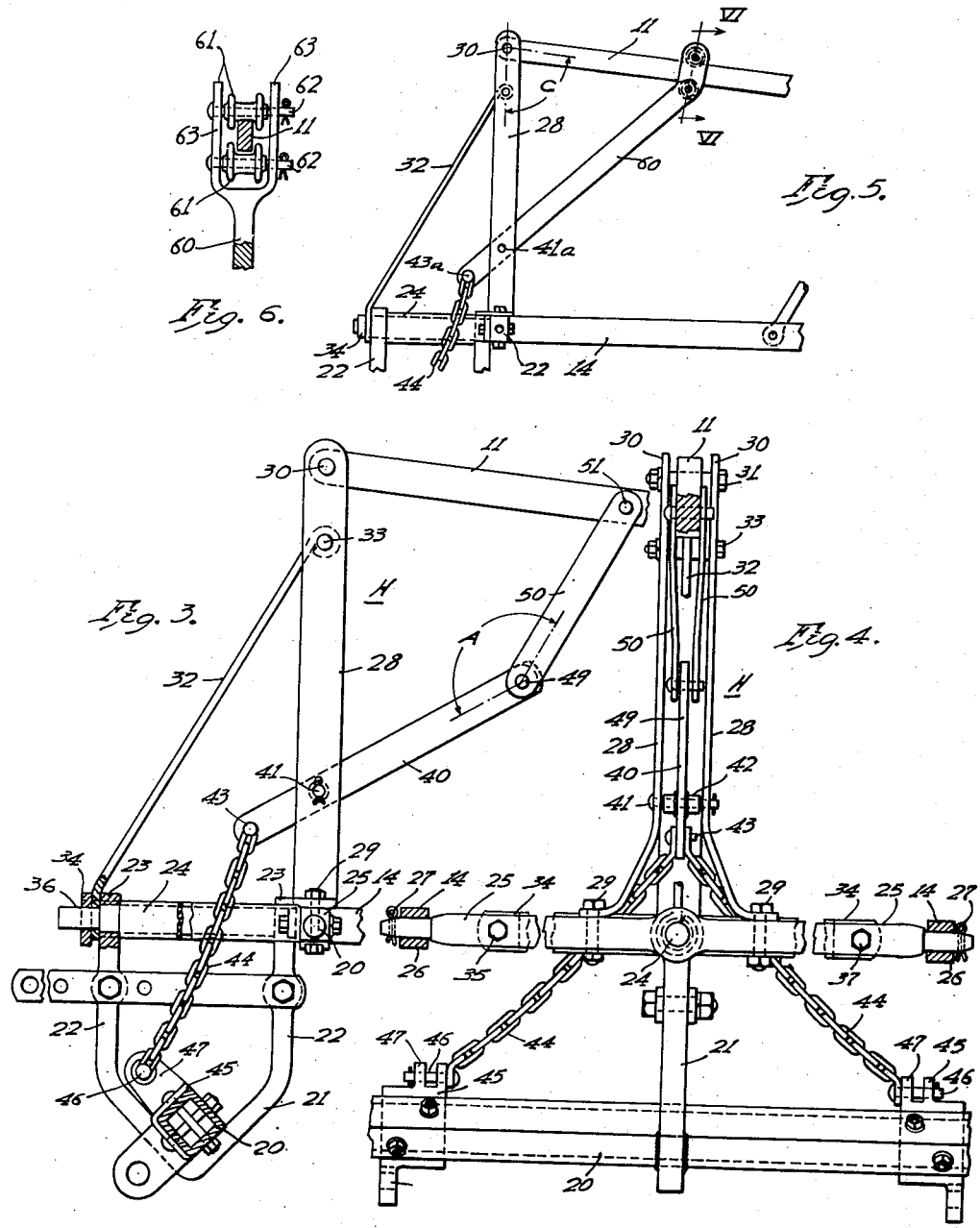

2,685,242

UNITED STATES PATENT OFFICE 2,685,242

IMPLEMENT ATTACHMENT

Easborn Rusco, Blue Island, Ill., assignor, by mesne assignments, to Ford Motor Company, Dearborn, Mich., a corporation of Delaware Application August 5, 1949, Serial No. 108,744

10 Claims. (Cl. 97—47.52)

My invention relates to an attachment for agricultural ground engaging implements whereby the implement may be secured to a source of motive power by a hitch which when the implement is in contact with the ground, in what is called the working position, the implement may tilt to accommodate itself to uneven ground contour, and when the implement is being transported it will be carried in a tilt-restrained position above and out of contact with the ground, in what is called the transporting position. Inasmuch as one use of the attachment is found in mechanism for hitching a corn planter, a typical ground engaging implement, to a tractor it will be described as useful in connection therewith.

In the accurate planting of seed corn it is necessary that the corn planter, such as a check-row planter, be secured to the power tractor by a hitch which allows transverse vertical tilting relative to the line of advance of the planter. This is so because the planter must accommodate itself to the irregular contour of the ground over which it is worked in order that the seed corn may be planted at a substantially uniform predetermined depth. It is also desirable that the planter be hitched to the motive power, such as a tractor, so that the planter can be carried in a desired and controlled position relative to the ground being worked, not only when planting is taking place but also when the planter is being transported. When it is necessary to move the planter over ground that is not to be planted it is the practice, when the power operated hitching attachment is used, to lift the planter clear of the ground in which position, in the known hitches, the planter is free to oscillate around a portion of the attaching device thus allowing the implement to tilt or rock more or less freely. This is undesirable as this tilting frequently sets up strains of considerable magnitude in the structure, and it is one of the objects of my invention to provide an attachment which will permit desired transverse tilting of the planter relatively to the tractor when the planter is in planting engagement with the ground, but when the planter is raised out of engagement with the ground, in what I term the carrying position or transporting position, the planter will be restrained against tilting transversely to the line of advance of the tractor and planter.

A further object of my invention is to provide a simple accessory to a conventional implement hitch which will enable a ground engaging implement to be carried above ground engaging position without tilting.

A still further object is to provide a lift leveling device useful in connection with an implement hitch and which is simple in design and is easily and cheaply fabricated.

In the accompanying drawings wherein I have illustrated the presently preferred embodiments of my invention:

Figure 1 is a view in side elevation of a conventional tractor and attached corn planter in the working position;

Figure 2 is a view in side elevation of a conventional tractor and attached corn planter in the transporting position;

Figure 3 is a view in side elevation and to a larger scale than that employed in Figure 1 of a hitch embodying my invention;

Figure 4 is a view in end elevation looking from the right or tractor end and toward the rear of the hitch shown in Figure 3, some of the parts being broken away;

Figure 5 is a view in side elevation of a portion of another hitch embodying my invention;

Figure 6 is a section along the line VI—VI of Figure 5, but to an enlarged scale, of a detail of that hitch;

Figure 7 is a view in side elevation of a portion of still another hitch mechanism; and Figure 8 is a view in end elevation of the mechanism shown in Figure 7.

Referring to the drawings, it will be observed that I have illustrated the invention as applied to the hitch or linkage mechanism H which connects a conventional gasoline powered tractor T to a more or less conventional corn planter indicated generally as P. Since the particular type or structure of the corn planter and the tractor are not of importance here and do not form the essence of the invention, they will be described only generally, and only such parts thereof will be referred to as are deemed necessary for an understanding of the invention.

A typical tractor T has a differential housing 10 to the rear of which a well known form of hitch or link mechanism H employing a plurality of spaced power lifted trailing hitch links is attached. The hitch may comprise a compression link 11 pivotally mounted at one end on a lever 12 which in turn is mounted on the upper portion of the differential housing 10. A compression spring 13, to take up shock, is connected between the lever 12 and a fixed point on the differential housing (see Figure 2). A pair of tension links or draw bars 14 are swivelly mounted at one end one on each of the opposite sides of the housing at points 15 near the bottom of the housing and forwardly of but below the point of attachment of the lever 12. The tension links are longer than the compression link and their lengths, the relative positions of the mounting on lever 12 and point 15, and the connection between the upper link 11 and the draw bar 14 later to be described, are so arranged and proportioned that when the connected implement P is in the working position, see Figure 1, the uprights 28 later to be described, which form in part a connection between the outer end of the link 11 and bars 14 are substantially vertically aligned, and when the links are in the raised or transporting position, see Figure 2, the compression or upper link 11 is upwardly inclined at an angle greater than the angle of the inclination of the tension links or draw bars 14.

Extending upwardly from an intermediate position on the draw bars 14 is a pair of angularly directed rods 16 each of which is connected at the top by means of a universal joint 17 to a hydraulically operated lever 18, which in turn is connected to a hydraulic motor (not shown) contained within the housing 10 and is adapted to be rotated when pressure fluid is admitted to the hydraulic motor by movement of a lever handle 19.

The planter P includes a horizontally extending frame portion or tool bar 20 which is positioned transversely to the line of advance of the planter. The tool bar is firmly secured, as by welding, to the lower end of a tool bar yoke 21, having two vertical parallel sides 22 which are journaled at their upper ends at spaced points 23 to a stub shaft 24 which extends horizontally at right angles from the center of a horizontal spacer member 25 which is parallel to the tool bar 20. On the outer ends 26 of the spacer member, the tension links or draw bars 14 are swivelly mounted, and retained by appropriate pins 27 against sidewise movement. The upright vertically extending braces 28, shaped as shown, and forming a vertically extending portion of the frame are rigidly secured as by bolts 29 to the spacer bar 25, one on each side of the center thereof, and at the upper ends have aligned openings 30 for receiving a bolt 31 which passes through one brace 28 thence through the outer end of the compression link arm 11 and finally through the opposite brace 28, thus providing a swivel mounting for the link arm 11. The spacer member 25 and the uprights 28 form an inverted T-shaped link connecting member or subframe having a vertically extending frame portion formed by the braces 28. A bracer bar 32 is secured to the outer end of the stub shaft 24, and extends angularly upwardly so that the upper end thereof is received between and secured by the bolt 33 to the upright braces 28. A second brace bar 34 is bolted at 35 to one side of the spacer member 25 and extends horizontally and outwardly to embrace the end of stub shaft 24 at 36 and thence extends to the other side of the spacer member 25 where it is bolted to it at 37.

It is apparent then that when the subframe is connected to the tractor links 14 and 11 as described, the remainder of the implement, represented by tool bar 20, can swing or tilt freely in a transverse vertical plane relative to the subframe.

The anti-tilt mechanism, shown in Figures 3 and 4, comprises in general an actuator lever 40 pivoted part way of its length between upright braces 28 by means of a pin 41 which passes through a sleeve 42 welded to the lever 40 and through the upright braces 28 at a point above the spacer member 25. The rear end or outer end of the lever 40 is swivelly connected by means of a pin 43 appropriately received in the lever, to two flexible members such as chains 44, one on each side of the lever. The chains extend downwardly and outwardly to two brackets 45 mounted on the tool bar 20 and spaced at equal distances on opposite sides of the stub shaft 24. The lower ends of the chains are secured by pins 46 to appropriate lugs 47 on the brackets 45. It is believed to be obvious and, therefore, not necessary to be illustrated that any arrangement for example a series of rods with a lost motion connection could be used in place of the flexible member. The function to be performed by the member connecting the pin 43, and the lug 47 is to permit movement between the pin 43 and lug 47 when the implement hitch is in a position which permits the implement to engage the ground and when the implement is raised by angular movement of the hitch links the distance between the pin 43 and the lug 47 is increased so that a connection therebetween may be tautened to prevent rocking of the implement.

The lever 40 extends angularly upwardly toward the rear of the tractor T and adjacent the upper end or inner end of the lever it is swivelly secured by a pin 49 between and to two oppositely disposed levers 50 which extend angularly upwardly to embrace the compression link 11 to which they in turn are swivelly connected by pin 51. It will be observed that the angle A (Figure 3) between the lever arms 40 and 50 is less than 180°.

A comparison of Figures 1 and 2 will show the positions assumed by the compression link 11, and the tension link or draw bars 14 when the linkage is moved upwardly by clockwise rotation of the hydraulically operated lever 18 which is controlled by the operation of lever handle 19. The arrangement is such that the whole hitch mechanism and the connected planter may be moved to swing through a vertical arc from a position shown in Figure 1 where the planter is in working position relative to the ground to a transporting position as shown in Figure 2 where the planter is raised from contact with the ground.

It will be observed in Figure 1 that when the planter is in working position, the lever arms 40 and 50 assume a position wherein the angle A is much greater than is the angle B (Figure 2) formed by the arms 40 and 50 when in the transporting position illustrated in Figure 2. By the operation of the lever system described, the position of pin 43 in Figure 1 is closer to the position of pin 46 than is the case in Figure 2—the transporting position. The length of the chain 44 is so selected that the chain in Figure 2 is taut and consequently the same length of chain will have slack when the mechanism is in the position shown in Figure 1—the working position. Accordingly, when the mechanism is in the working position the tool bar 20 will have limited rotation around the stub shaft 24 and transversely of it. Thus the planter can adjust itself to a considerable measure of unevenness in the ground to be planted, and will insure even disposition of the seed at the predetermined depth. When the planter is lifted to the transporting position, as in Figure 2, the chains 44 are taut and prevent swaying and tilting of the planter around the stub shaft 24, thus minimizing strains to which the connecting mechanism may be subjected. This is a feature new and useful and of considerable importance in the art.

In Figure 5, I show a chain tightening mechanism which is similar to that already described, but which in place of two jointed levers 40 and 50 employed in the construction shown in Figures 3 and 4, has only one lever 60 connected at one end, at 43a, to chain 44 and pivoted at 41a near that end to upright braces 28 and at the other end it embraces the compression link 11 which is slidably received between the flanges of two grooved wheels 61, journaled by the pins 62 which pass through the bifurcated ends 63 of lever 60. It is evident that a reduction in the angle C (Figure 5) between the link 11 and upright braces 28 which results when the hitching mechanism is lifted in a manner similar to that shown in Figure 2 will cause the pin 43a to move upwardly relative to the point 41a and cause tightening of the chains 44 in the same manner as was described in connection with Figure 1 through 4, and have the same tilt restraining effect on the tool bar 20 and the planter of which it is a part.

In the construction shown in Figures 7 and 8, I employ two flexible cables 70 and 71, each of which passes through an eye 72 received between the upright members 28b. One end of cable 71 is attached to one end of a tension spring 73, the other end of which is attached to one of the lugs 47, while the other end of the cable is connected to a point 74 on one of the draw bars 14 through an adjusting turn buckle 75. The other cable 70 is connected to the other lug and through the eye 72 to the other draw bar 14. In the ground-engaging position of the implement the cables 70 and 71 are slack to allow tilting of the implement, but when the hitch links are moved upwardly, which occurs when the implement is moved out of engagement with the ground, the angle E between the uprights 28b and draw bars 14 will be increased, and as also will the distance between the eye 72 and the point of attachment 74 of the cables to the draw bar. The cables will then be drawn taut to firmly restrain the implement from tilting crosswise.

It is within my contemplation to cause tightening of the tilt restraining mechanism by taking advantage of the relative movement between a point on the upright member, e. g. point 41 or sleeve 42 and a terminal on the tractor which movement is incident to the movement of the hitching links which takes place when the implement is moved out of ground engaging position. Inasmuch as the trailing hitch links are to be regarded as parts of the tractor, the hitching point of one end of the flexible member arrangement might be attached to a terminal point—located on a hitching link or on a suitable position on the tractor body, e. g. the rear axle housing. The idea is to have a more or less flexible or a lost motion connection which can be drawn taut by a change in distance between a point on the implement frame and a terminal point on the tractor, the connector also passing through a point on the member which connects the outer ends of the links.

While I have described the presently preferred embodiments of my invention it is to be understood that changes may be made therein within the scope of the following claims.

I claim:

1. An attachment for use with a tractor having a plurality of spaced power lifted trailing hitch links connecting the tractor to a ground engaging implement, said implement having a horizontally extending frame portion in fixed relation to the implement, a link connecting member having a vertically extending portion, means pivotally connecting the central portions of said horizontally extending frame portion and the link connecting member for relative movement in a vertical plane, a lever swivelly mounted between its ends on said vertically extending portion, a connection between one end of the lever and a hitch link and and a flexible connection at the other end of the lever between the other end and the horizontal frame portion, whereby upon relative angular movement between the link connecting members and the links, the connection with the horizontal frame portion is caused to tauten.

2. An attachment for use with a tractor having a plurality of spaced power lifted trailing hitch links connecting the tractor to a ground engaging implement, said implement having a horizontally extending frame portion in fixed relation to the implement, a link connecting member swivelly connected to the link ends and having a vertically extending portion, a pivoted connection between the central portions of said horizontal frame portion and the link connecting member for vertical movement, a lever swivelly mounted between its ends on the vertically extending portion, a flexible member connecting the outer end of the lever to the horizontal frame portion at a point on the frame portion between its ends and the pivoted connection, a member connecting the other end of the lever to one of the links, so that when the said one link is moved angularly with respect to the upright portion, the distance between the outer end of the lever and the point of connection of the flexible member to the horizontal frame portion will be altered.

3. An attachment for use with a tractor having a plurality of spaced power lifted trailing hitch links connecting the tractor to a ground engaging implement, said implement having a horizontally extending frame portion in fixed relation to the implement, a link connecting member swivelly connected to the link ends and having an upright portion, a pivoted connection between the central portion of said horizontal frame portion and the link connecting member for vertical movement, a lever swivelly mounted between its ends on the upright portion, a flexible member connecting the outer end of the lever to the horizontal frame portion at a point distant from the swivel connection, a connection between the other end of the lever and one of the links, so that when the said one link is moved angularly upwardly the distance between the outer end of the lever and the point of connection of the flexible member to the horizontal frame portion will be increased and the flexible member tautened.

4. An attachment for use with a tractor having a plurality of spaced power lifted trailing hitch links connecting the tractor to a ground engaging implement, said implement having a horizontally extending frame portion in fixed relation to the implement, a link connecting member swivelly connected to the link ends and having an upright portion, a pivoted connection between the central portion of said horizontal frame portion and the link connection member for vertical movement, a lever swivelly mounted between its ends on the upright portion, means connecting the inner end of the lever to one of the links, flexible members connecting the outer end of the lever to points on the horizontal frame portion spaced on opposite sides of the upright portion, said flexible members being of a length to permit limited oscillation of the horizontal frame portion in a vertical plane when the implement is in ground engaging position and when the implement is raised from ground engaging position the flexible members are pulled taut to prevent such oscillation.

5. An attachment for use with a tractor having a plurality of spaced power lifted trailing hitch links connecting the tractor to a ground engaging implement, said implement having a horizontally extending frame portion in fixed relation to the implement, a link connecting member swively connected to the link ends and having an upright portion with an eye therein, a pivoted connection between the central portion of said horizontal frame portion and the link connection member for movement in a transverse vertical plane, a flexible member fastened at one end to the horizontal frame portion and at the other end to one of said links and passing through the eye in the upright portion, said flexible member being of a length to permit limited oscillation of the horizontal frame portion in a vertical plane and relative to the link connecting member when the implement is in ground engaging position, and when the implement is raised from ground engaging position the flexible member is pulled taut to prevent such oscillation.

6. An attachment for use with a tractor having a plurality of spaced power lifted trailing hitch links connecting the tractor to a ground engaging implement, said implement having a horizontally extending frame portion in fixed relation to the implement, a link connecting member swively connected to the link ends and having an upright portion, a pivoted connection between the central portion of said horizontal frame portion and the link connection member for movement in a transverse vertical plane, a cable fastened at one end to the horizontal frame portion at a point distant from the pivoted connection and bearing on the upright portion, the other end of the cable being connected to one of said links, the cable length being such that when the implement is in ground engaging position the cable is slack and when the implement is out of ground engaging position the cable is taut.

7. For use with a tractor having a plurality of spaced power activated trailing hitch links connecting the tractor to a ground engaging implement, whereby the implement may be moved into and out of ground engagement, said implement having a horizontally extending frame portion, an attachment including a member having an upright portion and a spacer bar for swively connecting the ends of the links, a mounting for swively connecting the central portion of said horizontally extending frame and the member for movement in a vertical plane, an activator lever pivoted for upward and downward movement of one end thereof relative to the horizontally extending frame portion, a flexible member connecting said lever end and the horizontally extending frame portion between the center and end of the horizontally extending frame portion, and means for moving said lever end up and down relative to the horizontally extending frame portion when the implement is moved up and down whereby tension may be applied to the flexible member.

8. For use with a tractor having a plurality of spaced power activated trailing hitch links connecting the tractor to a ground engaging implement, whereby the implement may be moved into and out of ground engagement, said implement having a horizontally extending frame portion, an attachment including a member having an upright portion and a spacer bar for swively connecting the ends of the links, a mounting for swively connecting the central portion of the horizontally extending frame and the member for movement in a vertical plane, an actuator lever pivoted for upward and downward movement of one end thereof relative to the horizontally extending frame portion, a flexible member connecting said lever end and the horizontally extending frame portion between the center and end of the horizontally extending frame portion, said flexible member being slack when the implement is in ground engaging position, and means connecting the other end of the lever to one of said hitch links for moving said other end down and up when the said links are moved up and down, whereby the flexible member may be tautened when the link is moved up.

9. A ground engaging implement for use with a tractor having a plurality of spaced, power lifted trailing hitch links comprising a transversely extending main frame portion carrying ground engaging elements, a subframe adapted for attachment to the tractor hitch links, means pivotally connecting the central portions of said main frame portion and said subframe for relative movement in a vertical plane, a flexible force transmitting element operatively connected between said subframe and a point on said main frame distant from the pivotal connecting means, and means operatively connected between said element and one of said hitch links responsive to elevation of said hitch links for tensioning said element, thereby limiting pivotal movement of said main frame portion relative to said subframe.

10. A ground engaging implement for use with a tractor having a pair of laterally spaced power lifted trailing hitch links and a central top link comprising a transversely extending main frame portion carrying ground engaging elements, a subframe of a generally inverted T-shaped configuration, having connection devices respectively on the ends of its head portion adapted for connection to the tractor hitch links and a connection element on the top of its stem portion adapted for connection to the tractor top link, means for pivotally mounting said main frame on said subframe for movement in a vertical plane about a longitudinal axis passing through the juncture of said head and stem portions of said inverted T-shaped subframe, a pair of flexible force transmitting elements operatively connected respectively between said stem portion of said subframe and two laterally spaced points on said main frame on opposite sides of said longitudinal axis, and means operatively connected between said pair of flexible force transmitting elements and one of said tractor links and responsive to elevation of the tractor links for concurrently tensioning said elements, thereby restricting pivotal movement of said main frame portion relative to said subframe as the tractor links are raised.

References Cited in the file of this patent

UNITED STATES PATENTS

| Number | Name | Date |
| --- | --- | --- |
| 2,247,534 | Von Schlegell | July 1, 1941 |
| 2,269,987 | Raney et al. | Jan. 13, 1942 |
| 2,312,258 | Martin | Feb. 23, 1943 |
| 2,336,410 | McKay | Dec. 7, 1943 |
| 2,352,466 | Arps | June 27, 1944 |
| 2,363,749 | Rude | Nov. 28, 1944 |
| 2,401,837 | Mellen et al. | June 11, 1946 |
| 2,413,807 | Warne | Jan. 7, 1947 |
| 2,583,830 | Goble | Jan. 29, 1952 |
| 2,603,138 | Rafferty | July 15, 1952 |
| 2,604,027 | Hansen | July 22, 1952 |